May 5, 1959
R. P. GARRISON ET AL
2,885,212
PRESSURE OPERATED CHUCK
Filed March 1, 1954
2 Sheets-Sheet 1
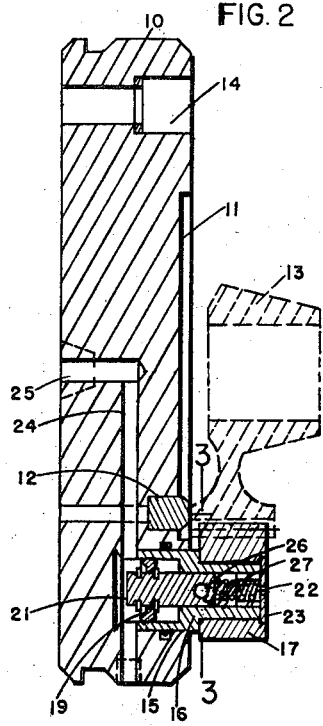
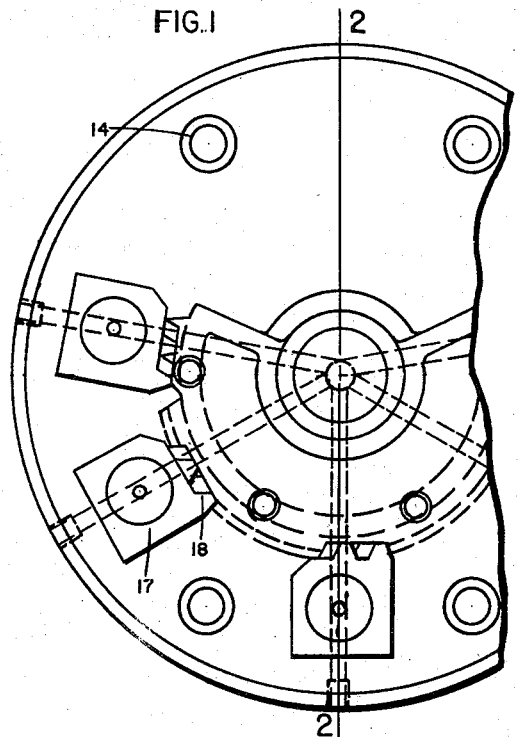
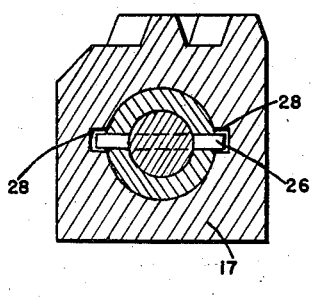
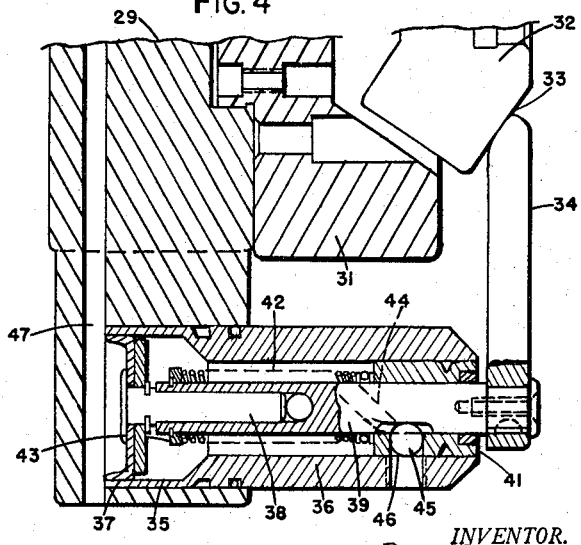
INVENTOR.
RALPH P. GARRISON,
JAMES O. GARRISON & DAVID D. WALKER
BY
Tom Walker May 5, 1959

R. P. GARRISON ET AL 2,885,212

PRESSURE OPERATED CHUCK

Filed March 1, 1954

INVENTOR.
RALPH P. GARRISON,
JAMES O. GARRISON & DAVID D. WALKER
BY
*Tom Walker*

2,885,212
PRESSURE OPERATED CHUCK

Ralph P. Garrison, James O. Garrison, and David D. Walker, Dayton, Ohio, assignors to Garrison Machine Works, Inc., Dayton, Ohio, a corporation of Ohio Application March 1, 1954, Serial No. 413,157

11 Claims. (Cl. 279—106)

This invention relates to chucks for holding a work piece while various machining operations are performed thereon. Although not so limited, the invention has especial application to a chuck for holding a gear blank. The invention has, moreover, particular application to pressure fluid operated chucks.

The object of the invention is to simplify the construction as well as the means and mode of operation of chucks as disclosed herein, whereby such chucks may not only be economically manufactured, but will be more efficient and accurate in use, adaptable to a variety of work pieces, have relatively few parts and be unlikely to get out of repair.

A further object of the invention is to eliminate many of the floating and fixed parts usually found in a mechanically operating chuck.

Another object of the invention is to reduce the overall size and weight of the chuck, whereby to provide reduced overhang in a machine tool and to make the chuck more readily useful in connection with large gears.

A further object of the invention is to utilize a plurality of chucking positions, each independent of the others whereby inequalities or differences in dimensions of the work being chucked are compensated for and approximately equal pressure exerted at all clamping points.

A further object of the invention is to provide a chuck possessing the advantageous structural features, the inherent meritorious characteristics and the mode of operation herein mentioned.

With the above primary and other incidental objects in view as will more fully appear in the specification, the invention intended to be protected by Letters Patent consists of the features of construction, the parts and combinations thereof, and the mode of operation, as hereinafter described or illustrated in the accompanying drawings, or their equivalents.

Referring to the accompanying drawings, wherein is shown the preferred but obviously not necessarily the only forms of embodiment of the invention, Fig. 1 is a fragmentary view, in plan, of a chuck in accordance with one illustrated embodiment of the invention, shown chucking a gear by engagement with the teeth thereof;

Fig. 2 is a view in cross section taken substantially along the lines 2—2 of Fig. 1;

Fig. 3 is a view in longitudinal section taken substantially along the line 3—3 of Fig. 2;

Fig. 4 is a view similar to Fig. 2 showing a modified form of chuck gripping a gear by engagement with sloping sides thereof;

Like parts are indicated by similar characters of reference throughout the several views.

Figure 5:
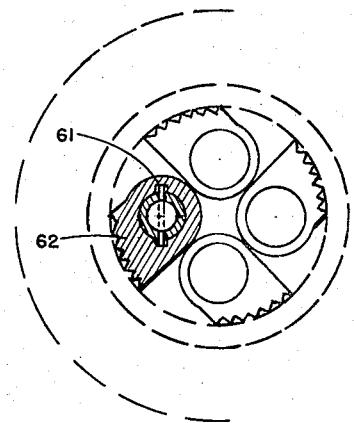
Fig. 5 is a view similar to Fig. 1, showing a chuck in accordance with a further modified form of the invention gripping a ring shaped gear by engagement with the inner surface thereof.

Referring to Figs. 1, 2 and 3 of the drawings, a chuck in accordance with this form of the invention includes a cylindrical body 10 having on one side thereof a planar surface 11 which may itself or through bearing studs 12 provide a mount for a work piece such as a gear 13. The body 10 also has a circular series of mounting holes 14 located to receive attachment bolts for the installing of the chuck in a machine tool. Also formed in circular series in the body 10 and opening to the exterior of the body on the same side as the planar surface 11, are bores 15.

Having substantially a press fit in each bore 15 is a cylinder or bushing 16, which element projects outside the bore 15 and beyond the plane of surface 11. The projecting end of the element 16 has rotatably mounted thereon a chuck jaw 17 which may also be considered a gear segment since it is formed with a toothed portion 18 on one end thereof. The construction and arrangement of parts is such that the several chuck jaws 17 lie in a plane parallel to the surface 11 and have their toothed portions 18 extending generally toward the axis of the body 10. The toothed portions 18 are adapted to engage the teeth on the gear 13 and it will be understood that a concomitant rocking of the jaws 17 in a counterclockwise direction as seen in Fig. 1 will result in a gripping and holding of the gear 13 whereas a return motion of the several chuck jaws in the opposite direction serves to release the gear 13. The one motion is sometimes termed a locking of the chuck while the return motion is termed unlocking of the chuck.

Within each bore 15 the cylinder 16 receives a piston 19 which has a sliding fit therein. A rod 21 is connected to the piston 19 and has a sliding bearing in the projecting part of the cylinder-bushing element 16. A compression spring 22 is interposed between the outer end of rod 21 and a cap 23 closing the element 16, such spring tending to press the rod 21 and piston 19 inward or in a retracting direction in the bore 15. A pressure fluid passage 24 leads to the bottom of the bore 15, beneath the piston 19, from a pressure fluid inlet 25 which opens through the body 10 of the side opposite surface 11.

When pressure fluid, such as compressed air, is supplied from inlet 25 through passage 24 to the bottom of bore 15, the piston 19 and rod 21 are extended in the bore 15 against the resistance of spring 22. When the pressure fluid supply is discontinued, the piston and associated parts are returned in a retracting direction by the spring 22.

Figure 7:
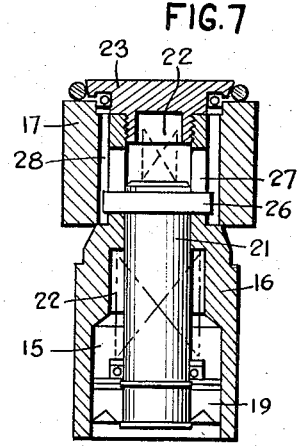
Fig. 7 is a detail view of a cylinder-bushing element comprised in the embodiment of Figs. 1–3.

The described reciprocating motion of the piston and piston rod is utilized to effect a rocking motion of the chuck jaw 17 to gripping and releasing positions. Thus, the rod 21 carries a transverse pin 26 which extends through an inclined slot 27 (Fig. 7) in the element 16 and into opposed straight tracks or grooves 28 in the chuck jaw 17. Accordingly, with the parts positioned as shown in Fig. 2, an extending motion of the rod 21 under the influence of applied pressure fluid causes a simultaneous rotating motion of the rod by reason of the connection of the pin 26 in the inclined or spiral slot 27. At the same time, since the pin 26 is engaged in the grooves 28 of jaw 17, the rotary motion of the rod 21 is transmitted to the chuck jaw. Similarly, when the rod 21 is axially returned in the opposite direction by the spring 22, a rotary motion of the rod is initiated in an opposing sense, likewise resulting in a rocking of the chuck jaw 17.

The illustrated construction and arrangement of parts is such that the jaw is moved to gripping position under the influence of the springs 22 and is released by action of the pressure fluid on the piston 19 but it will be understood that this mode of operation could be reversed if desired.

The pressure fluid inlet 25 is connected by other passages 24 to each of the several bores 15. The applying of and discontinuing of fluid pressure in the chuck, which may be a remotely initiated operation, thus is effective simultaneously with respect to all of the chuck jaws 17 so that the several jaws move in unison to and from gripping position.

Referring to Fig. 4 of the drawing, a chuck body 29 has mounted thereon a locating ring 31 constructed and arranged to engage the teeth of a bevel gear 32 for the aligning of such gear with the chuck body. Further, a sloping surface 33 on the rear of the gear 32 is engaged by a plurality of chuck jaws 34 which hold the gear in place on the locating ring 31 and which are adjustable to gripping and releasing positions.

The jaws 34 are arranged in circular series and have their inner ends overlying respective bores 35 in the body 29. Each of the bores 35 has a cylinder element 36 stationarily received therein and providing a chamber for a piston 37. A rod 38 is connected at its one end to the piston 37 and is received at its other end in a piston rod extension 39 which projects through and beyond the cylinder element 36 and has a sliding bearing in a bushing 41 located in the outer end of the element 36. A compression spring 42 is interposed between the bushing 41 and a collar 43 on the piston rod extension 39 in such fashion as to maintain the rod 38 and 39 in unitary relation and to urge the piston 37 toward the bottom of bore 35.

Further, the piston rod extension 39 is formed with a spiral groove 44 in which is received a ball 45 mounted in an opening 46 in the bushing 41. According to this construction and arrangement of parts, therefore, an extending motion of the piston 37 and rod extension 39 results in a simultaneous rotating of the rod extension 39 as the inclined surface of the groove 44 encounters the relatively stationary ball 45. The extension member 39 has motion in one rotary sense as it is extended outward and has rotary motion in the opposite sense as it is retracted inwardly. An extending motion of the member 39 is effected, as in the embodiment of Figs. 1–3, by pressure fluid admitted to the bottom of piston 37 by way of a passage 47. Retracting motion of the extension member 39 is effected by the spring 42 which is compressed by the aforementioned extending motion.

The chuck jaw 34 is attached to the projecting outer end of the extension member 39. During each extending and retracting motion of the member 39, therefore, the jaw 34 has a compound rocking motion by which it rocks to grip or to release the work and at the same time is shifted bodily into and out of an overlying relation to the work to simplify removal and replacement.

It will further be understood that the form of invention illustrated in Fig. 4 contemplates the use of a plurality of chuck jaws 34 and associated operating parts and a single source of fluid pressure therefor as in the embodiment of Figs. 1–3.

Figure 6:
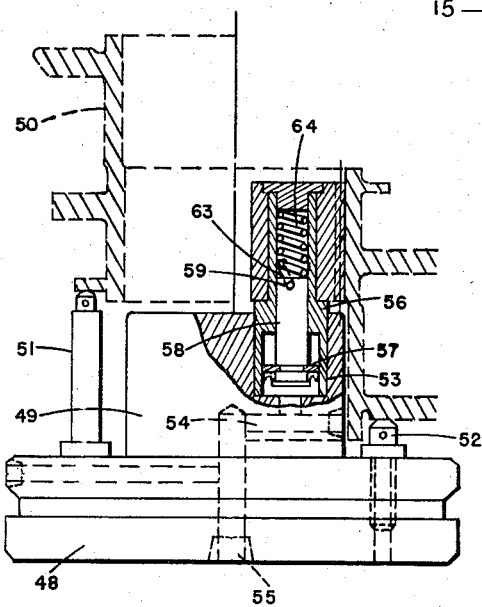
Fig. 6 is a view in side elevation, partly broken away, of a chuck gripping a gear and in accordance with the form of the invention shown in Fig. 5.

That form of the invention shown in Figs. 5 and 6 is similar to the structure disclosed in Figs. 1–3, but modified for the chucking of an internal gear or the like. A body 48 thus is formed with an axial projection 49 surrounded by bearing studs 51 and 52 supporting a hollow gear member 50.

The projection 49 is formed with a circular series of bores 53 connected by respective passages 54 to a common air inlet 55. There is installed in each of the bores 53 a cylinder-bushing element 56, a piston 57 and a piston rod 58 all constructed in substantially the same manner and operating in substantially the same manner as corresponding elements of Figs. 1–3. Still further like the former embodiment, the rod 58 is connected by a cross pin 59 to grooves 61 in a respective chuck jaw 62, the pin 59 further passes through an inclined slot 63 in the element 56. A spring 64 urges the rod 58 and piston 57 downward in the bore 53 and serves as a retracting means following extension of the piston and piston rod under the influence of pressure fluid supplied from inlet 55.

The above described cam connection, involving pin 59, slot 63 and grooves 61 resolves an axial reciprocating motion of the rod 58 into a rocking motion of the jaw 62 in an oscillatory sense. The jaw 62 is cooperative with the teeth on the internal wall of the gear 50 and has an eccentric, serrated edge for this purpose. The several jaws 62 coperate under the urging of their respective piston assemblies in the gripping and releasing of the gear member.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect.

Having thus described our invention, we claim:

1. A chuck, including a body, a plurality of chuck jaws mounted on said body for pivotal motion in one direction to grip the work and in the opposite direction to release the work, piston bores in said body, one for each of said chuck jaws, a piston reciprocable in each of said bores, means forming a connection between each of said pistons and a respective one of said chuck jaws resolving a reciprocating motion of said piston into an oscillatory motion of said jaw in a single plane, a pressure fluid inlet in said body, passages conducting pressure fluid from said inlet to said bores for moving said pistons in one direction and resilient means for returning said pistons in the opposite direction.

2. A chuck, including a body presenting a substantially planar surface, a circular series of chuck jaws arranged in a common plane parallel to said surface for pivotal adjustment in a single plane into and out of work gripping position, a circular series of piston bores in said surface, a piston in each of said bores and connected to a respective one of said chuck jaws, means for reciprocating said pistons in said bores and means forming the connecting means between each piston and a respective chuck jaw for resolving at least a part of the reciprocating motion of said pistons into a pivotal motion of said chuck jaws.

3. A chuck, including a body presenting a planar surface, swinging chuck jaws in a plane parallel to said surface, pressure fluid operated piston means in said body, and connections between said piston means and said chuck jaws for effecting gripping and releasing motions of said jaws respectively in a single plane relatively to a work piece on said planar surface in response to extending and retracting motions of said piston means.

4. A chuck according to claim 3, characterized in that said last named means comprises cam means resolving at least part of the motion of said piston means into a swinging motion of said jaws in a common plane.

5. A chuck, including a body having a substantially planar work supporting surface, a piston bore in said body at right angles to said surface, a piston reciprocable in said bore, a rod on said piston, a bushing installed in said bore and projecting therefrom, said bushing providing a bearing for said rod, a chuck jaw rotatably mounted on said bushing and extending parallel to said planar surface, and a cam connection between said rod and said bushing effective on said chuck jaw to rock said jaw in an oscillatory sense in a fixed plane in response to a reciprocatory motion of said piston.

6. A chuck according to claim 5, characterized by a spring urging said piston in one direction and pressure fluid means for moving said piston in the opposite direction.

7. A chuck according to claim 6, wherein a plurality of chuck jaws and associated pistons are arranged in a circular series on said body, characterized in that said pressure fluid means comprises a pressure fluid inlet in said body having common connection to said pistons.

8. A chuck, including a body, a plurality of chuck jaws supported on said body for relative swinging motion to gripping and releasing positions with respect to a work piece engageable thereby, piston bores in said body, pistons reciprocable in said bores, means for admitting pressure fluid to said bores to move said pistons in one direction, springs compressed by movement of said pistons in said one direction and effective to return said pistons in the opposite direction upon discontinuing of the admission of pressure fluid, and means effecting swinging motions of said chuck jaws in a common plane in response to reciprocating movements of said pistons.

9. A chuck according to claim 8, characterized by a central reduced diameter projection on said body over which a hollow work piece is mounted, said chuck jaws being mounted on said projection for cooperative relation with the internal surface of the work piece.

10. A chuck including a body, piston bores in said body, pistons reciprocable in said bores, bearings for said pistons in said bores, chuck jaws rotatably mounted to said bearings in a common plane parallel to one face of said body, rods connected to said pistons and slidable in said bearings and means connecting said rods and said chuck jaws for rocking of said chuck jaws in a common plane on movement of said pistons.

11. A chuck including a body, piston bores in said body, pistons reciprocable in said bores, bearings for said pistons in said bores, chuck jaws rotatably mounted to said bearings and parallel to the face of said body, rods connected to said pistons and slidable in said bearings and means connecting said rods and said chuck jaws for rocking of said chuck jaws respectively in the plane thereof on movement of said pistons for jointly engaging said chuck jaws to or disengaging them from a work piece.

References Cited in the file of this patent
UNITED STATES PATENTS

| | | |
|---|---|---|
| 453,616 | Brown | June 9, 1891 |
| 566,702 | Sellers | Aug. 25, 1896 |
| 1,412,170 | Dixon | Apr. 11, 1922 |
| 1,424,754 | Cullen | Aug. 8, 1922 |
| 1,469,360 | Cullen | Oct. 2, 1923 |
| 1,568,049 | Briscoe | Jan. 5, 1926 |
| 2,018,088 | Poock | Oct. 22, 1935 |
| 2,463,064 | Stevenson | Mar. 1, 1949 |
| 2,667,356 | Forward | Jan. 26, 1954 |